United States Patent
Garrity et al.

(10) Patent No.: US 9,728,324 B2
(45) Date of Patent: Aug. 8, 2017

(54) TRANSFORMER CONSTRUCTION

(71) Applicant: SolarCity Corporation, San Mateo, CA (US)

(72) Inventors: Paul Garrity, Rockwall, TX (US); Arturo Silva, Allen, TX (US)

(73) Assignee: SolarCity Corporation, San Mateo ( * ) Notice: Subject to any disclaimer, the term of this patent is extended or adjusted under 35 U.S.C. 154(b) by 0 days.

(21) Appl. No.: 14/531,120

(22) Filed: Nov. 3, 2014

(65) Prior Publication Data

US 2015/0243431 A1 Aug. 27, 2015

Related U.S. Application Data

(63) Continuation of application No. 13/771,024, filed on Feb. 19, 2013, now Pat. No. 8,917,156, which is a (Continued)

(30) Foreign Application Priority Data

Nov. 3, 2011 (GB) .................................. 1118996.6

(51) Int. Cl.
*H01F 27/30* (2006.01)
*H01F 27/32* (2006.01)
(Continued)

(52) U.S. Cl.
CPC .......... *H01F 27/325* (2013.01); *H01F 27/24* (2013.01); *H01F 27/2847* (2013.01); (Continued)

(58) Field of Classification Search
CPC ........................................... H01F 27/00–27/30
(Continued)

(56) References Cited

U.S. PATENT DOCUMENTS 3,328,738 A * 6/1967 Broverman ............. H01F 30/14
336/170
4,234,865 A * 11/1980 Shigehara ............... H01F 27/02
336/192

(Continued)

FOREIGN PATENT DOCUMENTS

DE 202010004898 8/2010
EP 0577334 1/1994

(Continued)

OTHER PUBLICATIONS

Portions of prosecution history of U.S. Appl. No. 13/297,253, Mar. 5, 2013, Garrity, Paul, et al.

(Continued)

*Primary Examiner* — Tuyen Nguyen
(74) *Attorney, Agent, or Firm* — Kilpatrick Townsend & Stockton LLP (57) ABSTRACT

The invention relates to a transformer construction comprising a plurality of transformer cores configured to share magnetic flux paths and, as a result, at least one of the cores comprises a post and an associated sidewall having an effective cross-sectional area which is less than that of the post. Such a construction may be employed in a power conditioning unit, for example, for a photovoltaic module, which is configured to operate the cores out of phase from each other. Also described is a transformer winding comprising a longitudinal spine having a first turn emanating from a first portion of the spine in a first transverse direction and a second turn emanating from a second portion of the spine in a second transverse direction, wherein the second transverse direction is opposite to the first transverse direction.

12 Claims, 8 Drawing Sheets

Related U.S. Application Data continuation of application No. 13/297,253, filed on Nov. 15, 2011, now Pat. No. 8,410,889.

(51) Int. Cl.
  H01F 27/28    (2006.01)
  H02M 5/458    (2006.01)
  H01F 27/24    (2006.01)
  H01F 41/06    (2016.01)
  H01F 41/061   (2016.01)
  H01F 5/02     (2006.01)

(52) U.S. Cl.
  CPC .......... H01F 27/30 (2013.01); H01F 27/306 (2013.01); H01F 41/06 (2013.01); H01F 41/061 (2016.01); H02M 5/458 (2013.01); H01F 2005/025 (2013.01); Y10T 29/49071 (2015.01)

(58) Field of Classification Search
  USPC ............. 336/65, 83, 196, 198, 200, 225
  See application file for complete search history.

(56) References Cited

U.S. PATENT DOCUMENTS

| | | | | |
|---|---|---|---|---|
| 4,488,136 A * | 12/1984 | Hansen | ............... | H01F 30/12 336/10 |
| 4,988,968 A * | 1/1991 | Tochio | ............... | H01F 27/06 29/606 |
| 5,726,616 A * | 3/1998 | Bell | ............... | H01F 27/266 336/192 |
| 6,344,786 B1 * | 2/2002 | Chin | ............... | H01F 27/06 336/192 |
| 6,727,793 B2 * | 4/2004 | Piechnick | ............... | H01F 5/02 336/198 |
| D657,311 S | 4/2012 | Chan et al. | | |
| 8,310,332 B2 | 11/2012 | Yan et al. | | |
| 8,410,889 B2 | 4/2013 | Garrity et al. | | |
| 8,917,156 B2 | 12/2014 | Garrity et al. | | |
| 2004/0189432 A1 | 9/2004 | Yan et al. | | |
| 2010/0157632 A1 | 6/2010 | Batten et al. | | |

FOREIGN PATENT DOCUMENTS

| | | |
|---|---|---|
| EP | 1400988 | 3/2004 |
| EP | 2395517 | 12/2011 |
| GB | 1597508 | 9/1981 |
| GB | 2376807 | 12/2002 |
| GB | 2415841 | 1/2006 |
| GB | 2496163 | 5/2013 |
| JP | 2004-111754 | 4/2004 |
| WO | WO 2006/048688 | 5/2006 |
| WO | WO 2007/080429 | 7/2007 |
| WO | WO 2010/119324 | 10/2010 |
| WO | WO 2012/025684 | 3/2012 |

OTHER PUBLICATIONS

Portions of prosecution history of U.S. Appl. No. 13/771,024, Nov. 21, 2014, Garrity, Paul, et al.

Portions of prosecution history of GB 1118996, Mar. 1, 2012 (mailing date), Enecsys Limited.

International Search Report and Written Opinion of PCT/GB2005/050197, Feb. 14, 2006 (mailing date), Enecsys Limited.

International Preliminary Report on Patentability of PCT/GB2005/050197, May 8, 2007 (issuance date), Enecsys Limited.

* cited by examiner

TRANSFORMER CONSTRUCTION

CLAIM OF BENEFIT TO PRIOR APPLICATIONS

This application is a continuation application of U.S. patent application Ser. No. 13/771,024, filed Feb. 19, 2013, now published as U.S. Publication 2013/0229834. U.S. patent application Ser. No. 13/771,024 is a continuation application of U.S. patent application Ser. No. 13/297,253, filed Nov. 15, 2011, now issued as U.S. Pat. No. 8,410,889. U.S. patent application Ser. No. 13/297,253 claims priority to an earlier-filed United Kingdom Patent Application 1118996.6, filed Nov. 3, 2011. U.S. patent application Ser. No. 13/771,024, now published as U.S. Publication 2013/0229834, U.S. Pat. No. 8,410,889 and United Kingdom Patent Application 1118996.6 are incorporated herein by reference.

FIELD OF THE INVENTION

This invention relates to a transformer construction. Particularly, but not exclusively, the invention relates to a transformer construction for use in a power conditioning unit (inverter) such as those employed in photovoltaic (PV) modules for delivering ac power either directly to the mains (grid) utility supply or for powering mains (grid) devices directly, independently from the mains utility supply.

BACKGROUND TO THE INVENTION

Transformers transfer electrical energy from one circuit to another via inductively coupled conductor coils. More specifically, a varying current in a primary coil winding creates a varying magnetic flux in a core of the transformer, which in turn generates a varying magnetic field (i.e. induced voltage) through a secondary coil winding. When a load is connected to the secondary winding, an electric current will flow in the secondary winding thereby transferring electrical energy through the transformer to the load. The induced voltage in the secondary winding is proportional to the primary voltage and is determined by the ratio of the number of turns in the secondary winding to the number of turns in the primary winding. A transformer may therefore be configured to "step up" an ac voltage by making the number of turns in the secondary winding greater than the number of turns in the primary winding, or "step down" an ac voltage by making the number of turns in the secondary winding less than the number of turns in the primary winding.

Particular embodiments of the invention relate to transformers suitable for use in power conditioning units for delivering power from a dc power source (e.g. a photovoltaic module) to an ac output. Such power conditioning units are described in the Applicant's earlier published patent applications, for example, WO2007/080429. In that case, the power conditioning unit comprises an input for receiving power from a dc power source, an output for delivering ac power, an energy storage capacitor, a dc-to-dc converter having an input connection coupled to the input and an output connection coupled to the energy storage capacitor, and a dc-to-ac converter having an input connection coupled to the energy storage capacitor and an output connection coupled to the output and wherein a transformer is provided in the dc-to-dc converter.

It is an aim of the present invention to provide a transformer construction with minimal size and optimum efficiency and which may be suitable for use in power conditioning units such as those described above.

SUMMARY OF THE INVENTION

According to a first aspect of the present invention there is provided a transformer construction comprising: a plurality of transformer cores configured to share magnetic flux paths and wherein at least one of the cores comprises a post and an associated sidewall having an effective cross-sectional area which is less than that of said post.

Embodiments of the present invention therefore provide transformer constructions which employ shared magnetic paths thereby allowing the effective cross-sectional area of a core sidewall to be reduced so as to minimise the overall volume of the transformer. This is important to maximise the efficiency of the transformer since the volume is directly proportional to core losses.

It is noted that in a traditional transformer core, the cross-sectional area of a centre post would match (i.e. balance) the effective cross-sectional area of the associated sidewalls. For example, if the cross-sectional area of the post is 100 $mm^2$ and two sidewalls (e.g. limbs) are provided to close the magnetic path, each of the sidewalls would have a cross-sectional area of 50 $mm^2$—giving a combined effective cross-sectional area of 100 $mm^2$. The post would also be provided between two end walls, each having a cross-sectional area of 50 $mm^2$. In the event that three side walls were provided, each sidewall would require a cross-sectional area of 100 $mm^2/3$ in order to balance the transformer.

Unless stated otherwise, the cross-sectional areas referred to through this specification will be taken to be transverse to the length of the structures concerned.

Each post may be provided between two sidewall portions which combine to form said associated sidewall having a combined effective cross-sectional area which is less than that of said post.

The posts and sidewalls may be mounted on a common substrate wherein adjacent posts share a common sidewall. In other words, the cores may be integrated into a one-piece component. In certain embodiments, this structure may only form a first half of a transformer structure, and so a second half may be provided comprising an identical structure provided on a second substrate. In use, the first half and the second half will be disposed adjacent each other such that the respective posts and sidewalls abut each other to form a symmetrical structure.

Alternatively, the transformer cores may be mounted on one or more separate substrates which are disposed adjacent each other to allow magnetic flux to flow therebetween. As above, this structure may only form a first half of a transformer structure, and so a second half may be provided comprising an identical structure provided on additional substrates which are disposed facing each other to form a symmetrical structure.

Each post may be mounted on a separate substrate having at least one sidewall provided thereon.

A first post may be mounted on a first substrate; a second post may be mounted on a second substrate; and a third post may be provided, part of which is mounted on the first substrate and part of which is mounted on the second substrate. In certain embodiments, this structure may only form a first half of a transformer structure, and so a second half may be provided comprising an additional first post mounted on an additional first substrate; an additional second post mounted on an additional second substrate; and an additional third post provided, part of which is mounted on the additional first substrate and part of which is mounted on the additional second substrate. It will be understood that the first half and the second half will be disposed adjacent each other such that the first post, second post and third post abut the respective additional first post, additional second post and additional third post.

Three cores may be provided such that a middle post has two sidewalls which are shared respectively by the posts on either side of the middle post. Each shared sidewall may have a cross-sectional area which is greater than a cross-sectional area of a sidewall which is not shared. Each shared sidewall may have a cross-sectional area which is twice the cross-sectional area of a sidewall which is not shared.

Each transformer post may have an oval cross-sectional area.

The associated sidewall may have an effective cross-sectional area which is 10% to 40% less than that of said post. In a particular embodiment, the effective cross-sectional area of the associated sidewall may be 20% less than that of said post.

In accordance with a second aspect of the invention there is provided a transformer winding comprising a longitudinal spine having a first turn emanating from a first portion of the spine in a first transverse direction and a second turn emanating from a second portion of the spine in a second transverse direction; the second transverse direction being opposite to the first transverse direction.

Embodiments of the second aspect of the invention therefore provide a simple and effective structure for a transformer winding, which can be quickly and easily manufactured.

The transformer winding may be formed from a planar metal sheet and the first and/or second turn may comprise one or more slits along its length.

In accordance with a third aspect of the invention there is provided a method of forming a transformer winding comprising:
  providing a planar metal sheet;
  cutting said sheet to form a longitudinal spine having a first turn emanating from a first portion of the spine in a first transverse direction and a second turn emanating from a second portion of the spine in a second transverse direction, the second transverse direction being opposite to the first transverse direction; and
  winding the first turn in a first direction and the second turn in an opposite second direction.

The step of cutting said sheet may comprise stamping the required cuts in the sheet.

The method may further comprise forming one or more slits along the length of the first and/or second turn.

In accordance with a fourth aspect of the invention there is provided a transformer bobbin structure comprising:
  a primary bobbin mounted on a primary substrate;
  a secondary bobbin mounted on a secondary substrate;
  wherein the secondary bobbin is hollow and is configured for receipt of at least a portion of a transformer core therein and the primary bobbin is hollow and is configured for receipt of the secondary bobbin therein; and
  wherein at least one of the primary or secondary bobbins has a free end comprising a flange which is configured to maintain a pre-determined spacing between the primary and secondary bobbins.

Embodiments of the fourth aspect of the invention therefore provide a transformer bobbin structure which can simply and effectively provide a fixed physical separation between the primary and secondary bobbins such that leakage inductance will be controlled, which is a highly desirable effect in resonant converters.

The primary or secondary bobbin may be provided between two sidewalls mounted on the respective primary or secondary substrate and which are configured to abut the other of the primary or secondary substrate when the secondary bobbin is received within the primary bobbin.

The transformer bobbin structure may further comprise a primary winding provided around the primary bobbin and a secondary winding provided around the secondary bobbin. The primary winding and/or the secondary winding may be constituted by a transformer winding according to the second aspect of the present invention.

In accordance with a fifth aspect of the invention there is provided a transformer comprising the transformer construction according to the first aspect of the invention and/or a transformer winding according to the second aspect of the invention and/or a transformer bobbin structure according to the fourth aspect of the invention.

In accordance with a sixth aspect of the invention there is provided a power conditioning unit comprising a transformer according to the fifth aspect of the invention and a drive circuit arranged to operate the transformer.

In accordance with a seventh aspect of the invention there is provided a power conditioning unit for providing ac power from a photovoltaic (PV) panel comprising:
  a plurality of single phase transformers; and
  a plurality of drive circuits arranged to operate the plurality of transformers out of phase from each other;
  wherein the transformers are configured to share magnetic flux paths.

Embodiments of the seventh aspect of the invention therefore provide a power conditioning unit in which the volume of each transformer can be reduced as a result of the transformers being configured to share magnetic flux paths, which is possible due to their operation being out-of phase with each other.

Three transformers may be arranged to be operated by respective drive circuits with a 60 degree phase shift therebetween.

In accordance with an eighth aspect of the invention there is provided a method of operating a power conditioning unit for providing ac power from a photovoltaic (PV) panel comprising:
  providing a plurality of single phase transformers configured to share magnetic flux paths, the transformers being arranged to be operated by a plurality of associated drive circuits; and
  operating the plurality of transformers out of phase from each other.

The transformers referred to in the seventh and eighth aspects of the invention may be in accordance with the fifth aspect of the invention.

BRIEF DESCRIPTION OF THE DRAWINGS

These and other aspects of the invention will now be further described, by way of example only, with reference to the accompanying figures, in which.

DETAILED DESCRIPTION OF PREFERRED EMBODIMENTS

Power Conditioning Units

Figure 1:
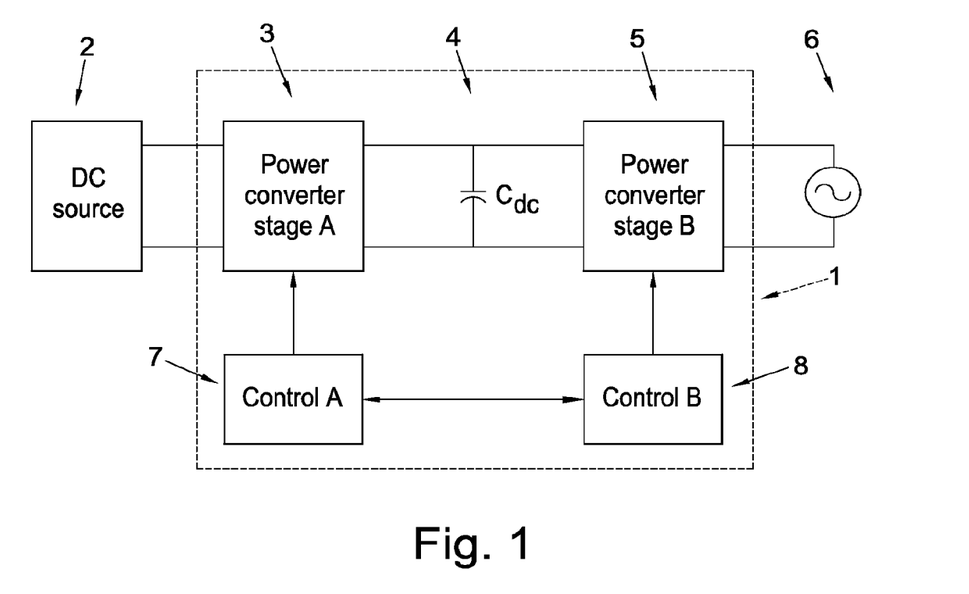
FIG. 1 shows an outline block diagram of an example power conditioning unit.

By way of background, we first describe an example photovoltaic power conditioning unit. Thus FIG. 1 shows a photovoltaic power conditioning unit of the type we described in WO2007/080429. The power converter 1 is made of three major elements: a power converter stage A, 3, a reservoir (dc link) capacitor $C_{dc}$ 4, and a power converter stage B, 5. The apparatus has an input connected to a direct current (dc) power source 2, such as a solar or photovoltaic panel array (which may comprise one or more dc sources connected in series and/or in parallel). The apparatus also has an output to the grid main electricity supply 6 so that the energy extracted from the dc source is transferred into the supply. Capacitor $C_{dc}$ is preferably non-electrolytic, for example a film capacitor.

The power converter stage A may be, for example, a step-down converter, a step-up converter, or it may both amplify and attenuate the input voltage. In addition, it generally provides electrical isolation by means of a transformer or a coupled inductor. In general the electrical conditioning of the input voltage should be such that the voltage across the dc link capacitor $C_{dc}$ is always higher than the grid voltage. In general this block contains one or more transistors, inductors, and capacitors. The transistor(s) may be driven by a pulse width modulation (PWM) generator. The PWM signal(s) have variable duty cycle, that is, the ON time is variable with respect to the period of the signal. This variation of the duty cycle effectively controls the amount of power transferred across the power converter stage A.

The power converter stage B injects current into the electricity supply and the topology of this stage generally utilises some means to control the current flowing from the capacitor $C_{dc}$ into the mains. The circuit topology may be either a voltage source inverter or a current source inverter.

Figure 2A:
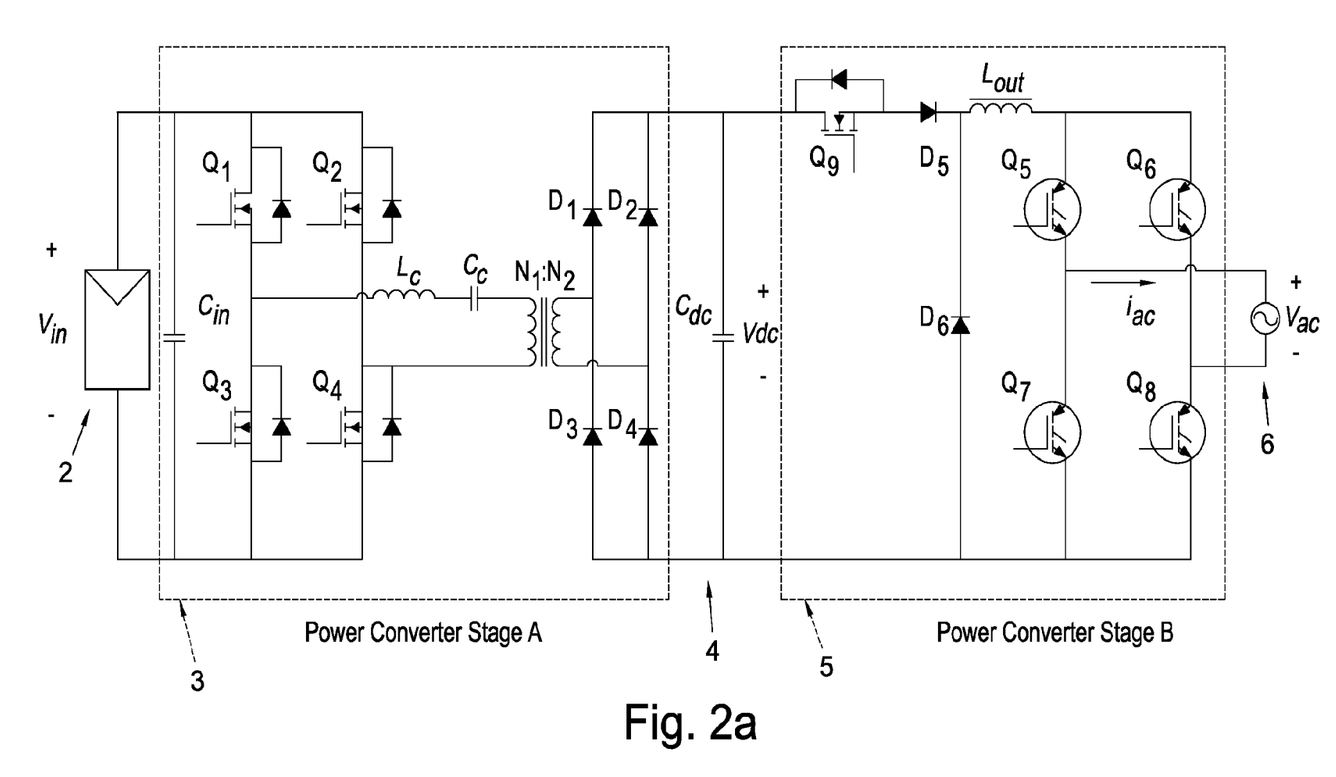
FIGS. 2a and 2b show details of a power conditioning unit of the type shown in FIG. 1.
Figure 2B:
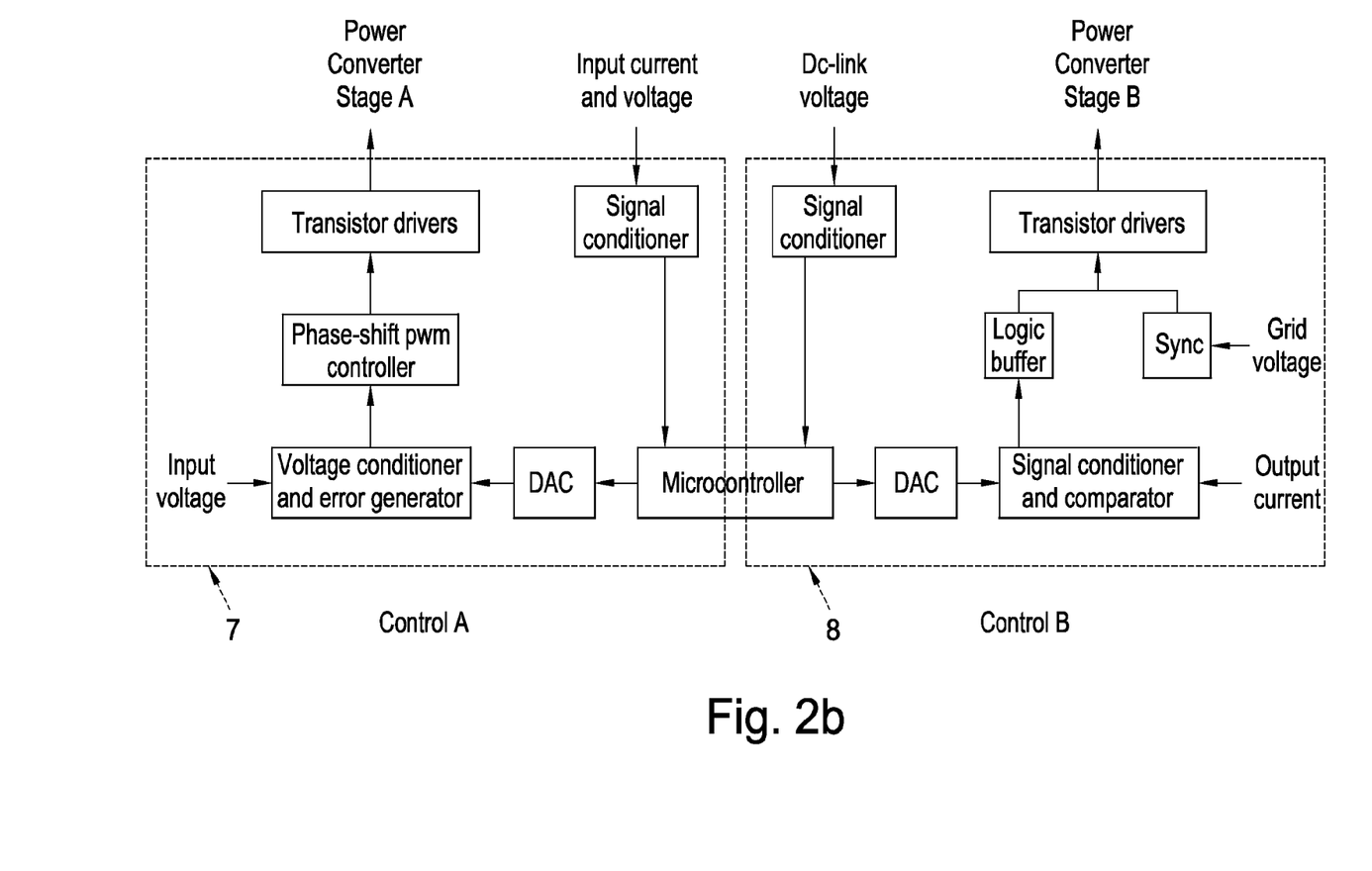

FIGS. 2a and 2b show details of an example power conditioning unit of the type shown in FIG. 1; like elements are indicated by like reference numerals. In FIG. 2a Q1-Q4, D1-D4 and the transformer form a dc-to-dc conversion stage, here a voltage amplifier. In alternative arrangements only two transistors may be used; and/or a centre-tapped transformer with two back-to-back diodes may be used as the bridge circuit.

In the dc-to-ac converter stage, Q9, D5, D6 and $L_{out}$ perform current shaping. In alternative arrangements this function may be located in a connection between the bridge circuit and the dc link capacitor: $D_6$ acts as a free-wheeling diode and $D_5$ prevents current form flowing back into the dc-link. When transistor $Q_9$ is switched on, a current builds up through $L_{out}$. When $Q_9$ is switched off, this current cannot return to zero immediately so $D_6$ provides an alternative path for current to flow from the negative supply rail ($D_5$ prevents a current flowing back into the dc-link via the body diode in $Q_9$ when $Q_9$ is switched off). Current injection into the grid is controlled using $Q_9$: when $Q_9$ is turned on the current flowing through $L_{out}$ increases and decreases when it is turned off (as long as the dc-link voltage is maintained higher than the grid voltage magnitude). Hence the current is forced to follow a rectified sinusoid which is in turn unfolded by the full-bridge output (transistors $Q_5$ to $Q_8$). Information from an output current sensor is used to feedback the instantaneous current value to a control circuit: The inductor current, $i_{out}$, is compared to a reference current, $i_{ref}$, to determine whether or not to switch on transistor $Q_9$. If the reference current is higher than $i_{out}$ then the transistor is turned on; it is switched off otherwise. The reference current, $i_{ref}$, may be generated from a rectified sinusoidal template in synchronism with the ac mains (grid) voltage.

Transistors Q5-Q8 constitutes an "unfolding" stage. Thus these transistors Q5-Q8 form a full-bridge that switches at line frequency using an analogue circuit synchronised with the grid voltage. Transistors Q5 and Q8 are on during the positive half cycle of the grid voltage and Q6 and Q7 are on during the negative half cycle of the grid voltage.

Thus in embodiments the power conditioning unit comprises a generic dc-ac-dc that provides voltage amplification of the source to above the grid voltage, and isolation, and a current source inverter (CSI) connected to the mains. The current injection is regulated using current shaping (current-control) in the inductor of the CSI via the intermediate buck-type stage. (This is described further in our GB2415841B, incorporated by reference).

Control (block) A of FIG. 1 may be connected to the control connections (e.g. gates or bases) of transistors in power converter stage A to control the transfer of power from the dc energy source. The input of this stage is connected to the dc energy source and the output of this stage is connected to the dc link capacitor. This capacitor stores energy from the dc energy source for delivery to the mains supply. Control (block) A may be configured to draw such that the unit draws substantially constant power from the dc energy source regardless of the dc link voltage $V_{dc}$ on $C_{dc}$.

Control (block) B may be connected to the control connections of transistors in the power converter stage B to control the transfer of power to the mains supply. The input of this stage is connected to the dc link capacitor and the output of this stage is connected to the mains supply. Control B may be configured to inject a substantially sinusoidal current into the mains supply regardless of the dc link voltage $V_{dc}$ on $C_{dc}$.

The capacitor $C_{dc}$ acts as an energy buffer from the input to the output. Energy is supplied into the capacitor via the power stage A at the same time that energy is extracted from the capacitor via the power stage B. The system provides a control method that balances the average energy transfer and allows a voltage fluctuation, resulting from the injection of ac power into the mains, superimposed onto the average dc voltage of the capacitor $C_{dc}$. The frequency of the oscillation can be either 100 Hz or 120 Hz depending on the line voltage frequency (50 Hz or 60 Hz respectively).

Two control blocks control the system: control block A controls the power stage A, and control block B power stage B. An example implementation of control blocks A and B is shown in FIG. 2b. In this example these blocks operate independently but share a common microcontroller for simplicity.

In broad terms, control block A senses the dc input voltage (and/or current) and provides a PWM waveform to control the transistors of power stage A to control the power transferred across this power stage. Control block B senses the output current (and voltage) and controls the transistors of power stage B to control the power transferred to the mains. Many different control strategies are possible. For example details of one preferred strategy reference may be made to our earlier filed WO2007/080429 (which senses the (ripple) voltage on the dc link)—but the embodiments of the invention we describe later do not rely on use of any particular control strategy.

In a photovoltaic power conditioning unit the microcontroller of FIG. 2b will generally implement an algorithm for some form of maximum power point tracking. In embodiments of the invention we describe later this or a similar microcontroller may be further configured to control whether one or both of the dc-to-dc power converter stages are operational, and to implement "soft" switching off of one of these stages when required. The microcontroller and/or associated hardware may also be configured to interleave the power transistor switching, preferably to reduce ripple as previously mentioned.

Figure 3A:
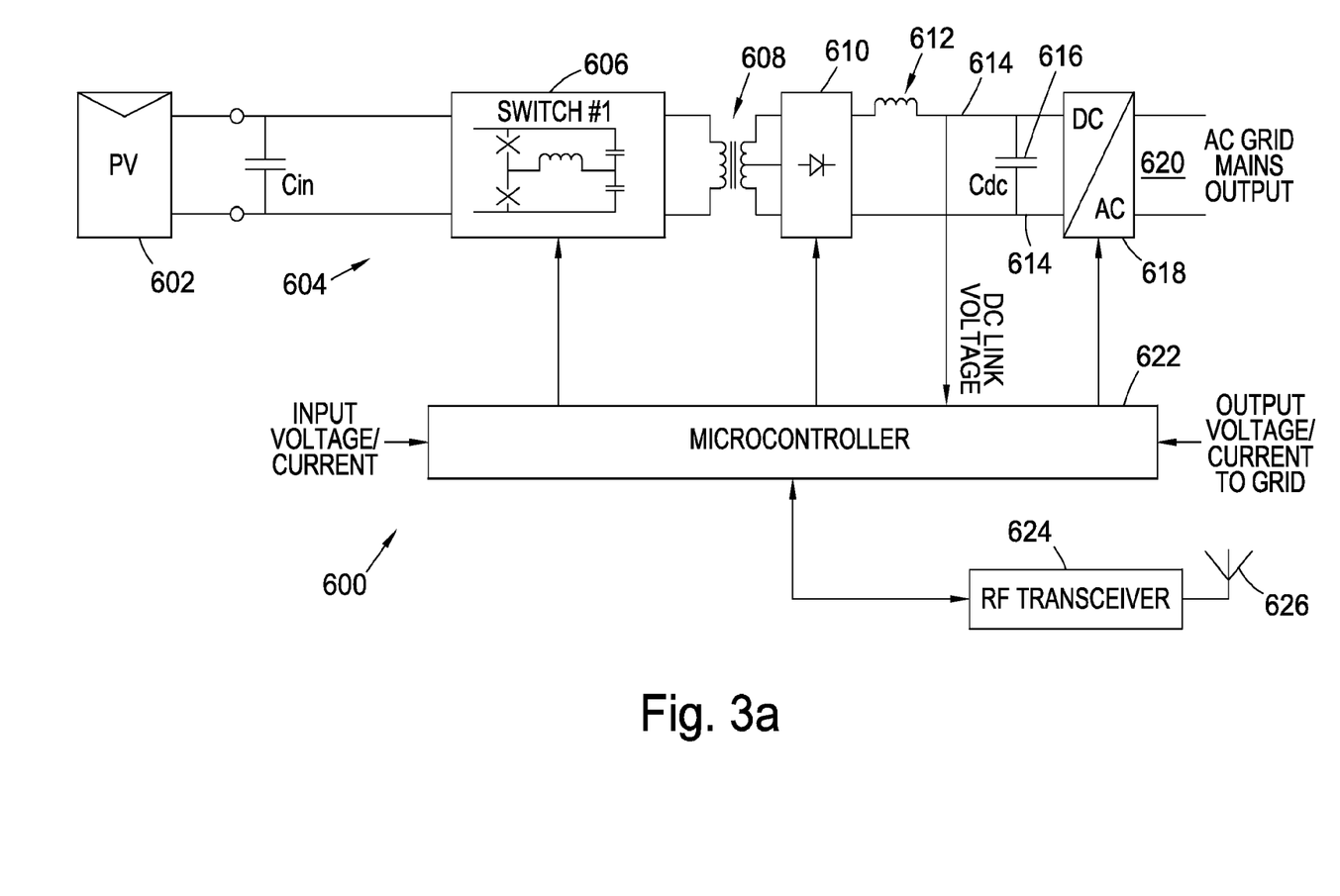
FIGS. 3a and 3b show details of a further example of solar photovoltaic inverter.

Now referring to FIG. 3a, this shows a further example of a power conditioning unit 600. In the architecture of FIG. 3a a photovoltaic module 602 provides a dc power source for dc-to-dc power conversion stage 604, in this example each comprising an LLC resonant converter. Thus power conversion stage 604 comprises a dc-to-ac (switching) converter stage 606 to convert dc from module 602 to ac for a transformer 608. The secondary side of transformer 608 is coupled to a rectifying circuit 610, which in turn provides a dc output to a series-coupled output inductor 612. Output inductor 612 is coupled to a dc link 614 of the power conditioning unit, to which is also coupled a dc link capacitor 616. A dc-to-ac converter 618 has a dc input from a dc link and provides an ac output 620, for example to an ac grid mains supply.

A microcontroller 622 provides switching control signals to dc-to-ac converter 606, to rectifying circuit 610 (for synchronous rectifiers), and to dc-to-ac converter 618 in the output 'unfolding' stage. As illustrated microcontroller 622 also senses the output voltage/current to the grid, the input voltage/current from the PV module 602, and, in embodiments, the dc link voltage. (The skilled person will be aware of many ways in which such sensing may be performed). In some embodiments the microcontroller 622 implements a control strategy as previously described. As illustrated, the microcontroller 622 is coupled to an RF transceiver 624 such as a ZigBee™ transceiver, which is provided with an antenna 626 for monitoring and control of the power conditioning unit 600.

Figure 3B:
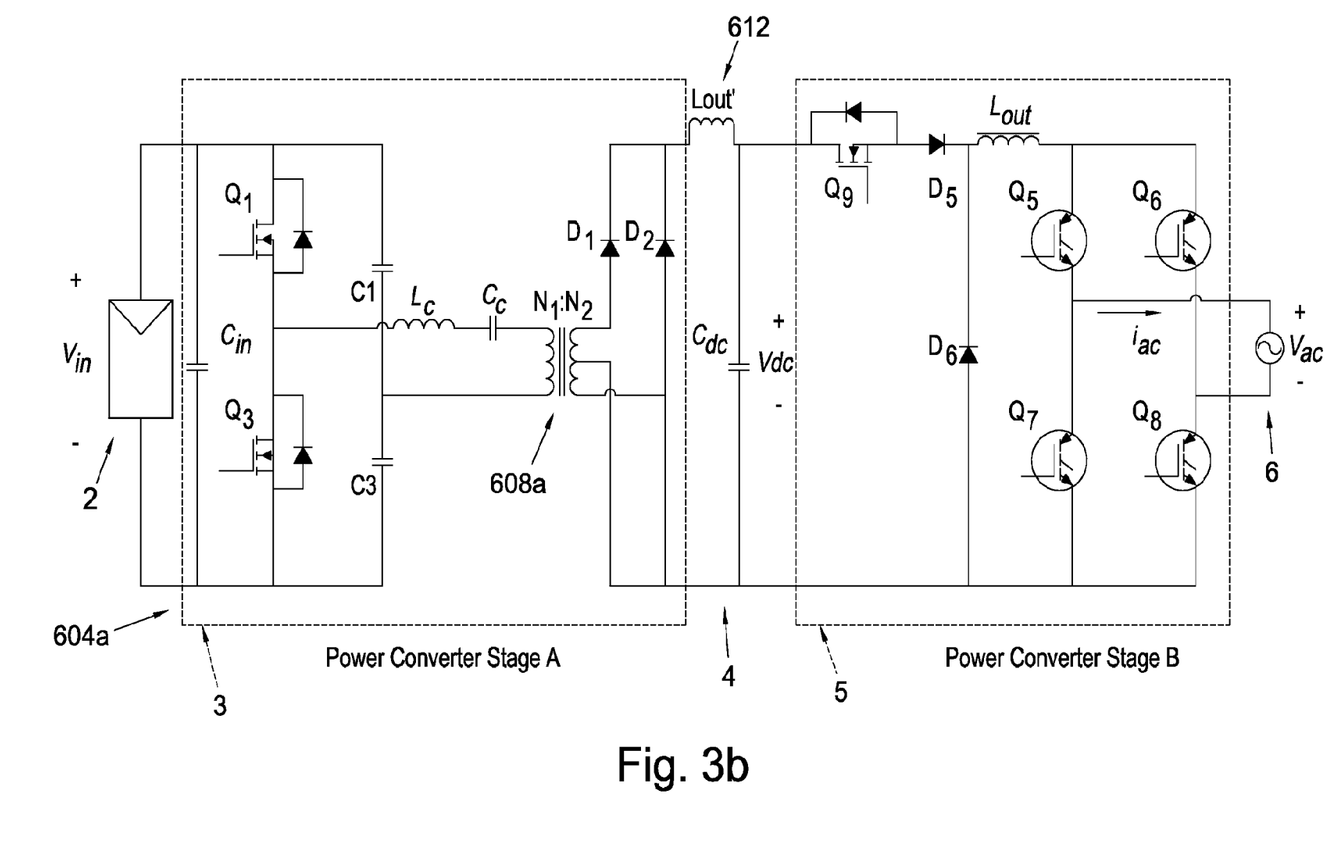

Referring now to FIG. 3b, this shows details of a portion of an example implementation of the arrangement of FIG. 3a. This example arrangement employs a modification of the circuit of FIG. 2a and like elements to those of FIG. 2a are indicated by like reference numerals; likewise like elements to those of FIG. 3a are indicated by like reference numerals. In the arrangement of FIG. 3b an LLC converter is employed (by contrast with FIG. 2a), using a pair of resonant capacitors C1, C3.

The circuits of FIGS. 1 to 3 are particularly useful for microinverters, for example having a maximum rate of power of less than 1000 Watts and or connected to a small number of PV modules, for example just one or two such modules. In such systems the panel voltages can be as low as 20 volts and hence the conversion currents can be in excess of 30 amps RMS.

Transformer Constructions

We will now describe transformer constructions which may be employed in the circuits of FIGS. 1 to 3.

Figure 4A:
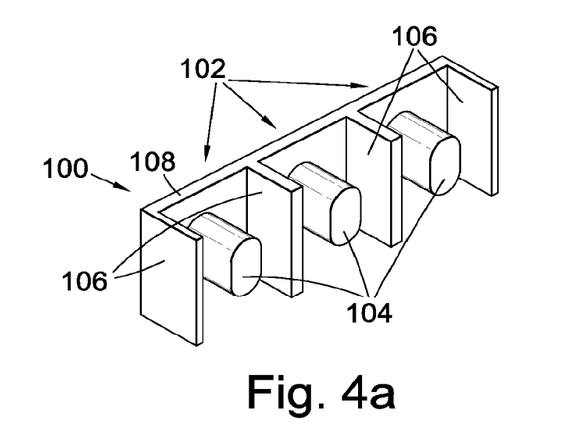
FIGS. 4a, 4b and 4c show transformer constructions according to embodiments of the present invention.

FIG. 4a shows a transformer construction 100 in accordance with an embodiment of the present invention. The transformer construction 100 comprises three transformer cores 102 which are conjoined and are therefore configured to share magnetic flux paths. Each core 102 comprises a post 104 provided between two sidewall portions 106 which combine to form an associated sidewall having a combined effective cross-sectional area which is 20% less than that of the post 104. More specifically, the posts 104 each have a cross-sectional area of 100 mm$^2$ and the associated sidewall has an effective cross-sectional area of 80 mm$^2$. The posts 104 and sidewalls 106 are mounted on a common substrate (i.e. back wall) 108 and are arranged such that adjacent posts 104 share a common sidewall 106.

It will be noted that the three cores 102 are provided such that a middle post 104 has two sidewalls 106 which are shared respectively by the posts 104 on either side of the middle post 104. Each shared sidewall 106 also has a cross-sectional area which is greater than a cross-sectional area of a sidewall 106 which is not shared. In this particular embodiment, each post 104 has an oval cross-sectional area as this further helps to minimise the volume of the transformer whilst allowing for optimum efficiency.

The transformer construction 100 may be employed in a power conditioning unit similar to that described above but wherein three separate DC sources are provided (e.g. constituted by three photovoltaic substrings). In which case, three separate drive circuits may be employed to operate the three cores 102 60 degrees out of phase from each other on a primary side of the transformer. Three outputs from the secondary side of the transformer may be connected in parallel before feeding into a dc link capacitor as described previously. The fact that the cores 102 are operated in a particular sequence (i.e. phasing) allows the cores 102 to share magnetic flux paths without creating interference. Accordingly, the transformer core 102 volumes can be minimised without adversely affecting performance. In fact, in particular embodiments of the invention it is possible to minimise the size and optimise the efficiency of the transformer since the volume of the transformer core is directly proportional to the core losses.

Figure 4B:
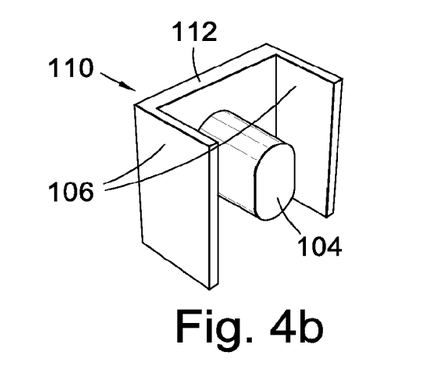

FIG. 4b shows a variant of the transformer construction 100 and so like parts will be indicated using like reference numerals. In essence, FIG. 4b shows a single transformer core 110 which may be magnetically coupled (e.g. connected) to two similar cores 110 to form the same structure as shown in FIG. 4a although this time it is formed from three discrete cores 110. Thus, the transformer core 110 comprises a post 104 provided between two sidewall portions 106. When two or more cores 110 are magnetically coupled together their respective sidewall portions 106 will combine to form an associated sidewall having a combined effective cross-sectional area which is 20% less than that of the post 104. The post 104 and two sidewalls 106 are mounted on an individual substrate (i.e. back wall) 112. As shown in FIG. 4b, each sidewall 106 is of the same thickness such that when two cores 110 are coupled together the effective thickness of the shared sidewall is doubled.

Figure 4C:
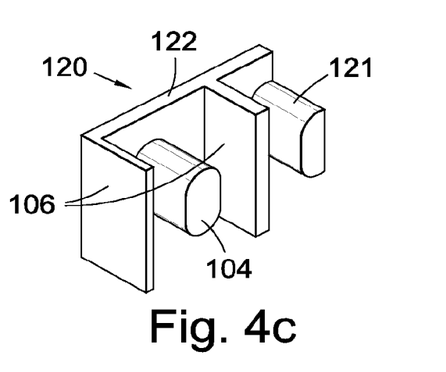

A further embodiment of the present invention is shown in FIG. 4c. This construction 120 effectively forms half of the transformer construction 100 of FIG. 4a and so like reference numerals will be employed for like parts. The transformer construction 120 therefore comprises a first post 104 and a first half of a second post 121 mounted on a first substrate 122. Two sidewalls 106 are provided around the first post 104 such that one of these forms a sidewall 106 that is shared with the first half of the second post 121. As described previously, the shared sidewall 106 is twice the thickness of the sidewall 106 that is not shared. It will be understood that in practice a second half of the construction 120 will be provided which will form a mirror image of the construction shown and which will comprise a second half of the second past 121 as well as a third post with associated sidewalls. Thus, the first and second halves will be configured such that they can be coupled together to form essentially the same structure as illustrated in FIG. 4a.

Figure 5A:
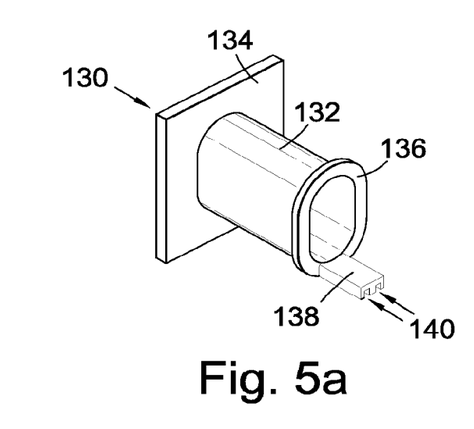
FIGS. 5a, 5b, 5c and 5d show a transformer bobbin structure according to embodiments of the present invention.
Figure 5B:
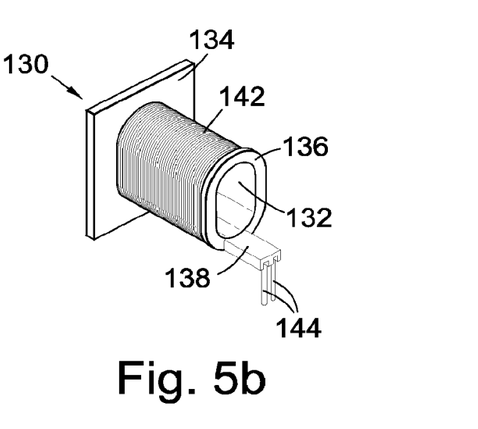

FIG. 5a shows a secondary bobbin structure 130 comprising an oval hollow (secondary) support 132—configured for receipt of a post 104 of one of the transformer cores described above-mounted in the centre of a rectangular planar secondary substrate 134 which has a central hole therethrough. A free end of the support 132 comprises an outwardly extending radial flange 136. At a lower end of the flange 136 there is provided a cuboidal feeder 138 having two discrete longitudinal channels 140 therethrough. As shown in FIG. 5b, a secondary winding 142 of cylindrical wire is wound around the outer surface of the support 132 and the two free ends 144 of the winding 142 are passed through the two longitudinal channels 140. Although not shown, these ends 144 will be connected to a secondary circuit to drive the transformer such as provided in the power conditioning units discussed above.

Figures 5C, 5D, 6, 7:
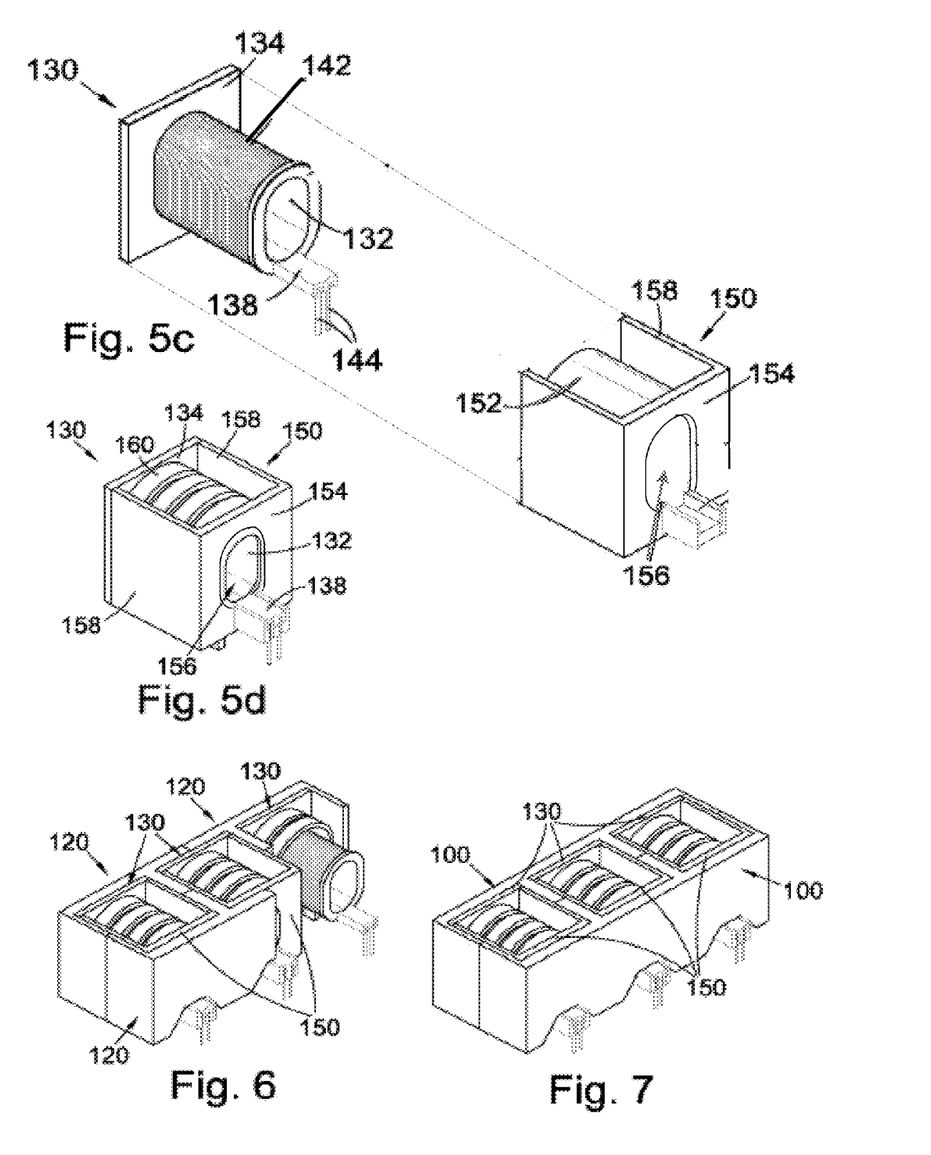
FIG. 6 shows the transformer construction of FIG. 4c combined with the bobbin structure of FIG. 5d according to an embodiment of the present invention.
FIG. 7 shows the transformer construction of FIG. 4a combined with the bobbin structure of FIG. 5d according to an embodiment of the present invention.

As shown in FIG. 5c, a primary bobbin structure 150 is provided which comprises a an oval hollow (primary) support 152 mounted in the centre of a rectangular planar primary substrate 154 which has a central hole 156 therethrough. Two sidewalls 158 are provided on the primary substrate 154 on either side of the support 152. As illustrated, the primary support 152 is placed around the secondary support 132 until the free ends of the primary support 152 and sidewalls 158 abut the secondary substrate 134. At the same time, the flange 136 will abut the primary substrate 154 and the inside of the primary support 152 to thereby maintain a desired spacing between the primary and second bobbin structures.

As shown in FIG. 5d, a primary winding 160 is wound around the primary support 152. Note, the primary winding 160 is likely to be provided on the primary support 152 before the primary bobbin 150 is placed over the secondary bobbin 130.

The two-piece transformer bobbin structure 130, 150 shown in FIGS. 5a to 5d can provide improved manufacturability and efficiency performance in a transformer, particularly when combined with a transformer core construction of FIGS. 4a to 4c. More specifically, the bobbin structure can achieve tight tolerances on leakage inductance by the ensuring a fixed physical separation between the primary and secondary windings 160, 142.

FIG. 6 shows the transformer construction of FIG. 4c combined with the bobbin structure of FIG. 5d according to an embodiment of the present invention. For ease of illustration, three out of four of the transformer core constructions 120 required in this embodiment are shown. More specifically, two constructions 120 are required to form a two-piece structure similar to that of FIG. 4a and the same structure again is required to double the length of each of the posts 104 and to form a complete and enclosed transformer structure. The transformer bobbin structure 130, 150 of FIG. 5d is provided around each of the three (doubled) posts 104 (although for clarity, the primary bobbin structure 150 is not shown around the last post 104). Thus, the combination of the transformer construction and the bobbin structure provides a compact and efficient transformer which can be employed in a power conditioning unit as described above.

FIG. 7 is similar to FIG. 6 but this time shows the transformer construction of FIG. 4a combined with the bobbin structure of FIG. 5d according to an embodiment of the present invention. Accordingly, only two of the transformer constructions 100 are required along with three of the transformer bobbin structures 130, 150, which are positioned over each post 104.

Figure 8A:
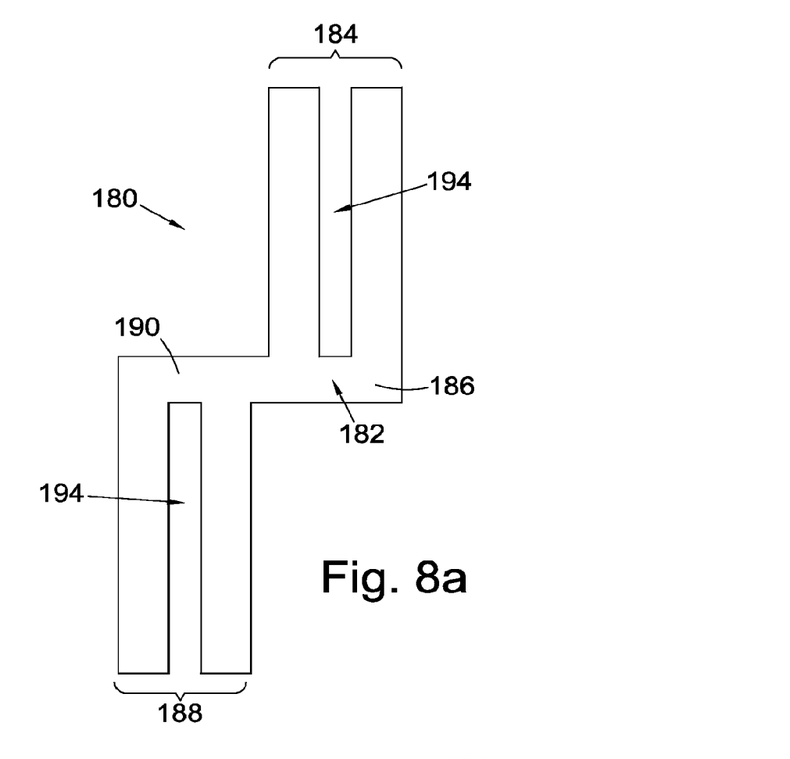
FIGS. 8a through 8e show a transformer winding in accordance with an embodiment of the present invention.
Figure 8B:
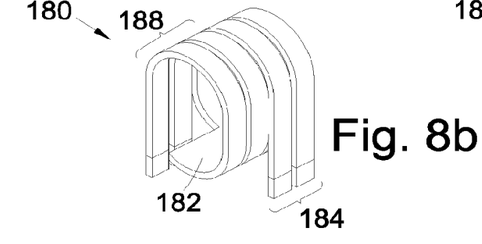
Figure 8C:
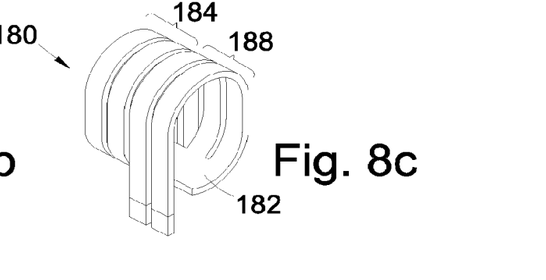
Figure 8D:
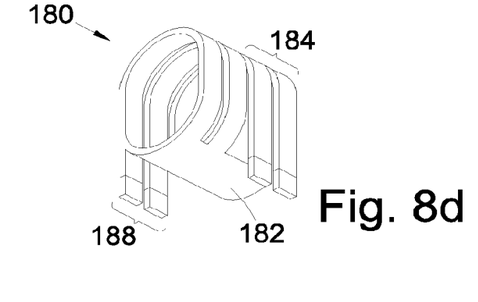
Figure 8E:
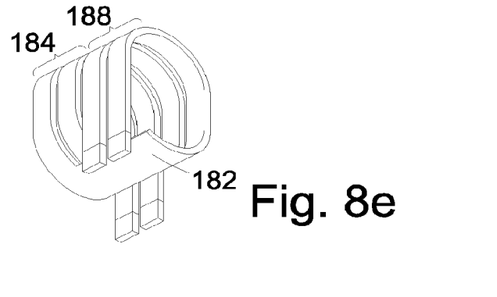

FIGS. 8a through 8e show a transformer winding 180 in accordance with an embodiment of the present invention. The transformer winding 180 may form the primary winding 160 described above. As shown in FIG. 8a, the transformer winding 180 is stamped from a planar copper sheet and comprises a longitudinal spine 182 having a first turn 184 emanating from a first portion 186 of the spine 182 in a first transverse direction and a second turn 188 emanating from a second portion 190 of the spine 182 in a second transverse direction which is opposite to the first transverse direction. Each turn 184, 188 comprises a slit 194 along the centre of its length which helps to improve efficiency minimizing eddy current loss.

In order to make the planar sheet of FIG. 8a into the winding 182 illustrated in FIGS. 8b to 8e, the first turn 184 is wound in a first direction (i.e. in a clockwise direction around a bobbin or core) and the second turn 188 is wound in an opposite (i.e. anti-clockwise) second direction. Accordingly, the winding 180 has a simple 2 turn structure which is quick and easy to manufacture and assemble.

Advantages of Various Embodiments

Some of advantages of the transformer structures and related features described above are as follows:
1) A high efficiency integrated magnetic structure that shares magnetic flux paths for volume optimisation;
2) Lower volume structure compared to single discrete transformers;
3) Stamped 2 turn primary winding with a simple (one forward, one back) fold forming sequence to achieve low dc resistance and low ac winding structure;
4) A 2 piece bobbin structure optimised for tight leakage inductance tolerance for improved resonant operation performance.

Accordingly, the various aspects of the present invention can provide a transformer construction or parts therefore with improved manufacturability and efficiency. A multiple piece manufacturing approach can be employed, that can be automated, such that all components of the core, windings and bobbins can be manufactured off-line and integrated together in a simple (few step) manufacturing process. Consequently, manufacturing errors can be minimised and reliability can be increased.

When employed in a power conditioning unit, the transformer is a key component in relation to overall efficiency and so each of the features and techniques described above which help minimise the losses associated with the transformer will greatly improve the overall efficiency of the power conditioning unit.

No doubt many other effective alternatives will occur to the skilled person. It will be understood that the invention is not limited to the described embodiments and encompasses modifications apparent to those skilled in the art which lie within the spirit and scope of the appended claims.

We claim:
1. A transformer comprising:
a transformer construction comprising a plurality of transformer cores configured to share magnetic flux paths and wherein at least one of the plurality of transformer cores comprises a post and an associated sidewall having an effective cross-sectional area which is less than that of said post;

a transformer bobbin structure comprising a primary bobbin mounted on a primary substrate and a secondary bobbin mounted on a secondary substrate, wherein the secondary bobbin is hollow and is configured for receipt of at least a portion of a transformer core therein and the primary bobbin is hollow and is configured for receipt of the secondary bobbin therein; and a primary winding positioned around a portion of the primary bobbin and comprising a longitudinal spine having a first turn emanating from a first portion of the spine in a first transverse direction and a second turn emanating from a second portion of the spine in a second transverse direction, the second transverse direction being opposite to the first transverse direction.

2. The transformer of claim 1, wherein the post and the sidewall are mounted on a common substrate, and wherein adjacent posts share a common sidewall.

3. The transformer of claim 1, wherein the transformer cores are mounted on one or more separate substrates that are disposed adjacent to each other to allow magnetic flux to flow between the transformer cores.

4. The transformer of claim 3, wherein each post is mounted on a separate substrate having at least one sidewall provided thereon.

5. The transformer of claim 3, wherein a first post is mounted on a first substrate; a second post is mounted on a second substrate; and a third post is provided, part of which is mounted on the first substrate and part of which is mounted on the second substrate.

6. The transformer of claim 1, wherein three posts are provided such that a middle post has two sidewalls that are shared respectively by the posts on either side of the middle post.

7. The transformer of claim 6, wherein each shared sidewall has a cross-sectional area that is greater than a cross-sectional area of a sidewall that is not shared.

8. The transformer of claim 6, wherein each shared sidewall has a cross-sectional area that is at least twice a cross-sectional area of a sidewall that is not shared.

9. The transformer of claim 1, wherein at least one of the primary or secondary bobbins has a free end comprising a flange that is configured to maintain a pre-determined spacing between the primary and secondary bobbins.

10. The transformer of claim 1, wherein the associated sidewall has an effective cross-sectional area that is 10% to 40% less than that of the post.

11. The transformer of claim 1, comprising three transformer bobbin structures each having at least a portion of a transformer core therein such that the transformer construction includes three transformer cores configured to share magnetic flux paths; and three separate DC sources, each having a separate drive circuit coupled to a separate transformer bobbin structure and operating 60 degrees out of phase from the other drive circuits.

12. The transformer of claim 1, wherein the primary winding includes one or more slits along a length of at least one of the first and the second turn.

* * * * *